ANTON PRIER.
Improvement in Arms for Railway Car Seats.
No. 121,255. Patented Nov. 28, 1871.
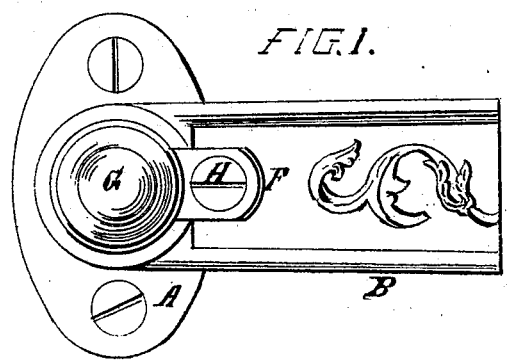
FIG. I.
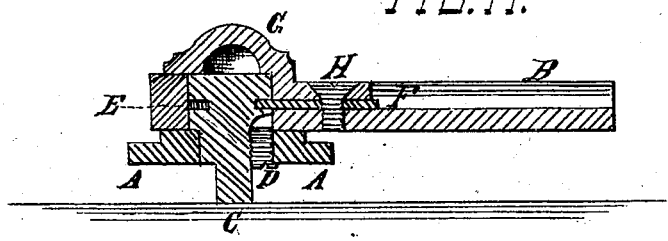
FIG. II.
WITNESSES
Chas. E. Craие.
L. Nathan
INVENTOR
Anton Prier
By J. B. Smith
his Atty in fact
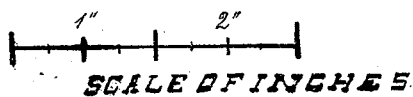
SCALE OF INCHES

UNITED STATES PATENT OFFICE.

ANTON PRIER, OF MILWAUKEE, WISCONSIN, ASSIGNOR TO LOEFFELHOLY & PRIER, OF SAME PLACE.

IMPROVEMENT IN ARMS FOR RAILWAY CAR-SEATS.

Specification forming part of Letters Patent No. 121,255, dated November 28, 1871.

*To all whom it may concern:*

Be it known that I, ANTON PRIER, of Milwaukee, in the county of Milwaukee, in the State of Wisconsin, have invented certain Improvements in Arms for Railway Car-Seats, of which the following is a specification:

My invention is for the purpose of securing the arm in place and have it vibrate from front to rear—that is, so that the rail may be turned so as to have the seat face in either direction; and the arm is secured to the pivot on which it works by means of a groove which is turned in the pivot, and a piece of iron or other metal is secured to the arm by a screw, and works in said groove.

Figure 1 is a plan view of my invention, and Fig. 2 is a sectional view of same.

A is the arm-plate; B, the arm; C, the pivot screwed into the arm-plate; D, a screw to prevent the pivot from unscrewing out of the plate; E, a recess turned in the pivot D; F, a stop which enters the recess E, with a hole in it; G, cap which covers the head of pivot D and forms a finish, and prevents the clothing from catching. This cap has a projection on one side of it with a hole in it which fits down in a slot in the arm and rests on stop F; and screw H, being screwed down through the projection and the stop F into the arm B, holds the stop F from slipping out and the cap G firmly in position, so that the arm may move forward and backward without obstruction.

I claim as my invention—

1. Arm-plate A, arm B, pivot C, recess E, stop F, and screw H, all in combination, substantially as described.

2. Arm-plate A, arm B, pivot C, screw D, recess E, stop F, cap G, and screw H, arranged substantially as described.

ANTON PRIER.

Witnesses:
J. B. SMITH,
JOHN FORSHU.

(121)